United States Patent [19]
Peuchot et al.

[11] Patent Number: 5,896,226
[45] Date of Patent: *Apr. 20, 1999

[54] OPTICAL DEVICE FOR THE VISUALIZATION OF A THREE DIMENSIONAL VIRTUAL IMAGE IN SUPERPOSITION WITH A REAL OBJECT, ESPECIALLY FOR SURGICAL APPLICATIONS

[75] Inventors: Bernard Peuchot, Veyre-Menton; Alain Tanguy, Clermont-Ferrand; Michel Eudes, Royat, all of France

[73] Assignee: Centre National de la Recherche Scientifique (CNRS), Paris, France

[*] Notice: This patent issued on a continued prosecution application filed under 37 CFR 1.53(d), and is subject to the twenty year patent term provisions of 35 U.S.C. 154(a)(2).

[21] Appl. No.: 08/750,544
[22] PCT Filed: May 3, 1995
[86] PCT No.: PCT/FR95/00573
  § 371 Date: May 14, 1997
  § 102(e) Date: May 14, 1997
[87] PCT Pub. No.: WO95/33221
  PCT Pub. Date: Dec. 7, 1995

[30] Foreign Application Priority Data

May 31, 1994 [FR] France ................... 94 06623

[51] Int. Cl.$^6$ ....................................... G02B 27/24
[52] U.S. Cl. ........................ 359/472; 349/8; 349/15; 348/51; 250/201.1
[58] Field of Search ........................ 359/471, 472, 359/462, 479, 630; 345/8, 9; 353/28; 349/15; 348/51; 250/201.1

[56] References Cited

U.S. PATENT DOCUMENTS

| | | |
|---|---|---|
| 4,674,837 | 6/1987 | Knüttel et al. . |
| 5,106,179 | 4/1992 | Kamaya et al. . |
| 5,230,623 | 7/1993 | Guthrie et al. . |

FOREIGN PATENT DOCUMENTS

| | | |
|---|---|---|
| 0515328 | 11/1992 | European Pat. Off. . |
| 0537945 | 4/1993 | European Pat. Off. . |
| 25514 | 5/1910 | United Kingdom ........... 359/471 |

*Primary Examiner*—Jon Henry
*Attorney, Agent, or Firm*—Weiser and Associates P.C.

[57] ABSTRACT

Optical device for viewing a virtual three dimensional image superimposed on a real object and characterized in that it includes means for forming a three dimensional virtual image and two semi-transparent mirrors arranged between the observer and the real object at a given angle of inclination to reflect the computer-generated virtual image of the real object.

12 Claims, 2 Drawing Sheets

OPTICAL DEVICE FOR THE VISUALIZATION OF A THREE DIMENSIONAL VIRTUAL IMAGE IN SUPERPOSITION WITH A REAL OBJECT, ESPECIALLY FOR SURGICAL APPLICATIONS

BACKGROUND OF THE INVENTION

1. Field of the Invention

The field of the present invention is an optical device for the visualization of a three-dimensional virtual image in superposition with a real object, especially for surgical applications.

2. Description of the Related Art

In the state of the art, processes are known for the construction of three-dimensional synthesized images from images obtained with imaging means such as a scanner, a tomograph or any other equivalent device. These images are then used for guiding surgical instruments.

As an example, German patent DE 3717871 describes an optical representation process and device for surgical interventions.

This process is intended for the reproducible optical representation of an intervention to be implemented with the aid of a surgical instrument. In this process the tomographic data for the part of the body in which the surgical intervention will be implemented are entered into the data memory of a data processing system. The data relative to the position of the field of intervention are determined from the tomographic data. In the process according to this prior document, the surgical instrument is fixed on a freely movable three-dimensional support, and the data relative to the position of the surgical instrument are determined by means of a coordinate measurement device and transmitted to the data processing system, which establishes a relation between the data relative to the position of the surgical instrument and the data relative to the position of the field of intervention, and with which the surgical instrument is oriented to the field of intervention by means of this relation. The process involves the following steps:

- at least three measurement points accessible from the exterior are determined or established as reference points on the body part,
- tomograms including the measurement points are implemented on the body part and entered into the data memory,
- the position in space of the measurement points is determined by the coordinate measurement device;
- the measured data are entered into the data memory,
- the data processing system establishes a relation between the image data of the measurement points contained in the tomograms and the data determined by the coordinate measurement device from the measurement points,
- the coordinate measurement device continuously detects the position in space of the freely movable three-dimensional surgical instrument, and the position data are transmitted to the data processing system,
- the data processing system superposes the data relative to the position of the surgical instrument to the tomographic image data, and the data processing system produces superposition images on an output device, particularly a visualization screen, in which the tomographic image contents and the respective positions of the surgical instrument are superposed.

The processes according to the state of the art, however, do not allow satisfactory exploitation of the three-dimensional images under the usual operating conditions. The visualization devices of the prior art impose a specific operating technique, which is not very compatible with the usual movements of the visualization operator on an independent screen or on a helmet.

SUMMARY OF THE INVENTION

The goal of the present invention is to resolve these drawbacks by proposing a visualization device that can be used under the usual working conditions, notably with regard to the lighting conditions of the real object, the operator movement positions, and the modes of visual accommodation. The device according to the invention is intended, in particular, to create very luminous three-dimensional synthesized images allowing the superposition of these images on a strongly illuminated real object, e.g., illuminated by a Scialytique operating light commonly employed in operating rooms. The invention also proposes a device compatible with the aseptic conditions required for surgical use.

Although the device according to the invention is particularly suitable for application in an operating room, it is not limited to surgical use and can be employed for all other applications in the fields of recreation, education or industry.

The device according to the invention has a means for the formation of very luminous images and two semitransparent mirrors positioned between each observation point—each of the viewer's eyes—and the real observed zone, maintained in place and oriented in a manner so as to reflect each synthesized image towards the corresponding observation point.

The comfort in use of the device is optimal when the distance separating the mirror support and the image-formation support is close to the distance separating the mirror support and the real observed object. A specific implementation variant involving a set of supplementary lenses, however, makes it possible to attain an acceptable comfort in use without observing this distance equality constraint.

Such a device makes it possible to implement a highly precise superposition, with errors lower than 0.5 millimeters evaluated in the three-dimensional reference system of the object.

Advantageously, the means for forming a virtual image is constituted by a back-lit electrooptical screen such as a liquid-crystal screen acting as the medium for the pair of stereoscopic images. The lighting device located at the end opposite to the reflecting mirrors comprises a high-intensity illumination source, an optical concentration unit and two Fresnel lenses concentrating the luminous flux on the semi-reflective mirrors.

In accordance with an implementation variation, an optical measurement device provides knowledge at all times of the position of each observation point (eye) relative to the position of the semireflective mirrors and the recalculation of the pair of visualized images.

This analysis means outputs a signal allowing the recalculation of the pair of visualized images on the screen taking into account the position of the eye in relation to the semitransparent mirror.

BRIEF DESCRIPTION OF THE DRAWINGS

The invention can be more fully understood from the description below with reference to the attached drawings in which:

3

Figure 1:
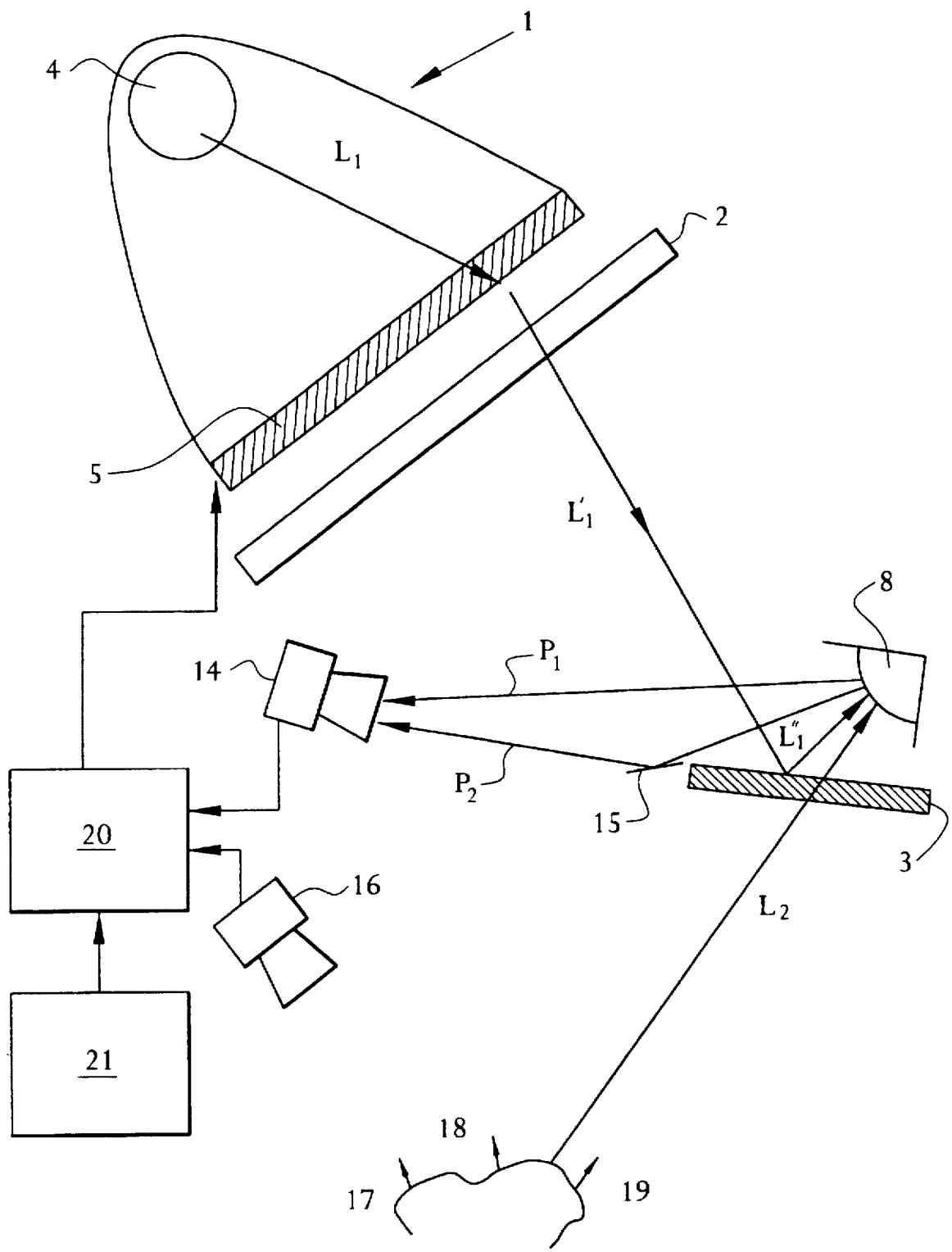
Figure 2:
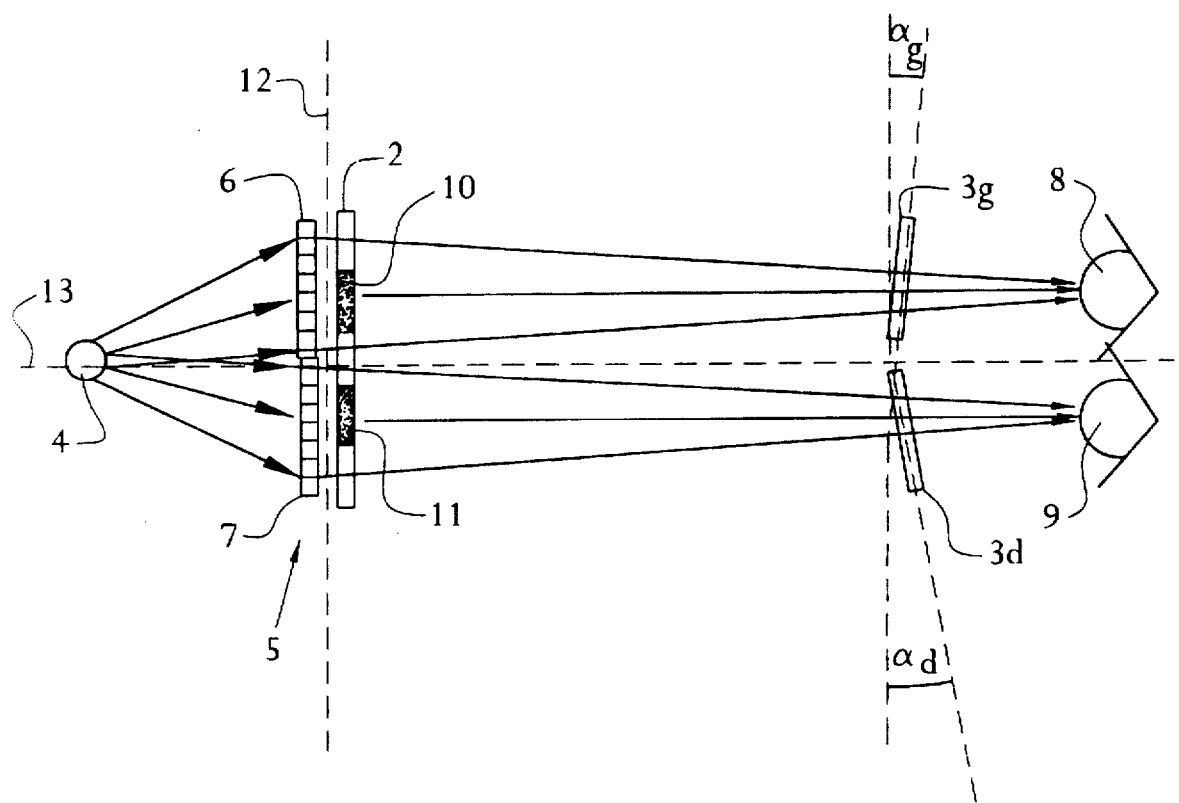

FIG. 1 represents a schematic view of the device along a longitudinal section plane;

FIG. 2 represents a view along a cross-sectional plane of the device.

DETAILED DESCRIPTION

FIG. 1 represents a schematic view of an example of implementation of an optical device according to the invention.

The device according to the invention principally includes:

a lighting unit (1);

a projection medium panel for the synthesized images (2);

the support of the semitransparent mirrors (3);

The lighting unit (1) is represented in FIG. 2. It is constituted by a halogen lamp and a concentrator formed of two Fresnel lenses (6, 7), the function of which is to concentrate the luminous flux on the semireflective mirrors (3, 3g, 3d) in the direction of each of the viewer's eyes (8, 9). The electronic panel (2), e.g., a liquid-crystal screen, is positioned next to the lighting unit (1). The electronic medium for the synthesized images (2) is connected to a computer that outputs suitable video signals. Each synthesized image (10,11) is calculated so as to form a pair of stereoscopic images the reflection of which in the corresponding mirror (3d, 3g) is superposed on the view of the real observed object.

The luminous path L1 originating from the lamp (4) traverses the Fresnel lens (6, 7) which reorients it according to the direction $L'_1$. The beam $L'_1$ traverses the screen (2) extracting the displayed luminous data, is reflected on the mirrors (3g or 3d) and reaches the viewer's eye (8, 9) according to the direction $L_2$. The perception of the very luminous beams $L_2$ originating from the synthesized images adjusted to each eye gives the illusion of a three-dimensional virtual object. The dimensional quality of this synthesized object is directly linked to the quality of the modeling which, assures perfect coherence between the synthesized beams and the real beams $L_2$.

The position of the viewer's eyes is calculated from the data provided by the camera (14) which observes the pupils along two different points of view: a direct path (P1) and a path (P2) reflected on a reversing mirror (15).

The position of the real object is calculated precisely from the data supplied by the camera (16) observing this object. Various techniques exist and have been published in the scientific literature: detection of apparent contours, subpixel detection of reference points (17, 18, 19 . . . ) attached securely on the studied object.

Knowledge of the position of the viewer's eyes, on the one hand, and of the position of the real object, on the other hand, makes it possible to continuously adjust the design of the two synthesized images (10, 11) so as to guarantee tracking and perfect superposition of the observed object.

The computer (20) receives the digital data from the cameras (14,16), calculates the position of the eyes (8, 9), calculates the position and the orientation of the observed object (17,18,19) and finally calculates the synthesized images (10, 11) to be displayed on the visualization screen (2) from the model of the object previously entered into the memory (21). The general calculation algorithm takes into account the correction of the geometric defects and distortions of the images from the cameras.

An example of a correction algorithm is described in the publication "COMPUTERIZED MEDICAL IMAGING AND GRAPHICS, Vol. 17, No. 4/5, pp. 289–294, 1993".

4

The algorithm is for the recalculation of synthesized images as a function of the position and the orientation of the object determined by automated observation of reference points (17 to 19) rigidly attached to the object or natural reference points such as apparent contours or contrast zones.

FIG. 2 represents a view along a cross-sectional plane of the device.

The two Fresnel lenses (6, 7) are constituted by two independent elements, or by a Fresnel lens in the form of a disk divided into two complementary parts.

The semitransparent blades (3d, 3g) form with the horizontal plane the respective angles $\alpha_d$ and $\alpha_g$ which are adjustable as a function of the geometric characteristics of the entire system.

The present invention was described above as a nonlimitative example. The expert in the field would be capable of implementing various variants without going beyond the scope of the invention.

We claim:

1. An optical device for the visualization of a three-dimensional virtual image in superposition with a real object, comprising:
   (a) means for forming a three-dimensional virtual image;
   (b) two semi-transparent mirrors, positioned between an observer and the real object and oriented to superpose the virtual image over the view of the real object;
   (c) means for generating position and orientation information for the observer and the real object; and
   (d) a computer configured to receive the position and orientation information from the information generating means, wherein the computer is adapted to control the generation of the three-dimensional virtual image by the image forming means and to control orientation of the two semi-transparent mirrors to adjust the superposition of the three-dimensional virtual image with the real object notwithstanding relative movement between the observer and the real object.

2. The optical device of claim 1, wherein means (a) comprises an electro-optical screen back-lit by a lighting unit to project the virtual image onto the semi-transparent mirrors.

3. The optical device of claim 2, wherein the lighting unit comprises a lamp and a pair of Fresnel lenses, positioned such that the Fresnel lenses focus light from the lamp so as to project the virtual image onto the semi-transparent mirrors for alignment with the observer's eyes.

4. The optical device of claim 2, wherein the computer is configured to maintain the length of the optical path from the electro-optical screen to the observer's eyes to be approximately equal to the length of the optical path from the real object to the observer's eyes.

5. The optional device of claim 2, wherein the electro-optional screen is a liquid-crystal screen.

6. The optical device of claim 1, wherein the computer is configured to maintain the length of the optical path from means (a) to the observer's eyes to be approximately equal to the length of the optical path from the real object to the observer's eyes.

7. The optical device of claim 1, wherein the information generating means comprises a camera adapted to analyze the position of the observer's eyes.

8. The optical device of claim 1, wherein the information generating means comprises a camera adapted to analyzed to analyze the position and orientation of the real object.

9. The optical device of claim 8, wherein the camera captures an image of reference points or reference contours on the real object.

10. The optical device of claim 8, wherein the information generating means further comprises another camera adapted to analyze the position and orientation of the observer's eyes.

11. The optical device of claim 1, wherein means (a) comprises a liquid-crystal screen back-lit by a lighting unit to project the virtual image onto the semi-transparent mirrors, wherein the lighting unit comprises a lamp and a pair of Fresnel lenses, positioned such that the Fresnel lenses focus light from the lamp so as to project the virtual image onto the semi-transparent mirrors for alignment with the observer's eyes, and the information generating means:

a first camera adapted to analyze the position of the observer's eyes; and a second camera adapted to analyze the position and orientation of the real object, wherein the second camera captures an image of reference points or reference contours on the real object;

wherein the computer is adapted to control the positions and orientations of the semi-reflective mirrors based on the analyses of the positions of the observer's eyes and the position and orientation of the real object.

12. The optical device of claim 11, wherein the computer is configured to maintain the length of the optical path from the liquid crystal screen to the observer's eyes to be approximately equal to the length of the optical path from the real object to the observer's eyes.

* * * * *